US007158789B2

(12) United States Patent
Casini et al.

(10) Patent No.: US 7,158,789 B2
(45) Date of Patent: Jan. 2, 2007

(54) COMMUNICATION NETWORK IN PARTICULAR FOR TELEPHONY

(75) Inventors: Andrea Casini, Faenza (IT); Pier Faccin, Savignano Sul Rubicone (IT)

(73) Assignee: Andrew Wireless Systems S.R.L. (IT)

( * ) Notice: Subject to any disclaimer, the term of this patent is extended or adjusted under 35 U.S.C. 154(b) by 408 days.

(21) Appl. No.: 10/088,123

(22) PCT Filed: Oct. 30, 2001

(86) PCT No.: PCT/IB01/02040

§ 371 (c)(1),
(2), (4) Date: Mar. 14, 2002

(87) PCT Pub. No.: WO02/37877

PCT Pub. Date: May 10, 2002

(65) Prior Publication Data

US 2003/0083084 A1    May 1, 2003

(51) Int. Cl.
*H04Q 7/20* (2006.01)
*H04B 1/38* (2006.01)
*H04B 7/00* (2006.01)
*H04B 1/18* (2006.01)
*H04B 1/06* (2006.01)

(52) U.S. Cl. .............. 455/446; 455/561; 455/272; 455/269; 455/280; 340/854.7

(58) Field of Classification Search ............. 455/446, 455/561, 562.1, 129, 272, 269, 280; 340/854.7
See application file for complete search history.

(56) References Cited

U.S. PATENT DOCUMENTS

| 5,339,184 A | 8/1994 | Tang |
| 5,424,864 A * | 6/1995 | Emura ............... 398/116 |
| 5,936,754 A * | 8/1999 | Ariyavisitakul et al. ...... 398/28 |
| 5,969,837 A | 10/1999 | Farber |
| 6,047,199 A * | 4/2000 | DeMarco ............... 455/572 |
| 6,337,754 B1* | 1/2002 | Imajo .................. 398/115 |
| 6,674,966 B1* | 1/2004 | Koonen ................ 398/70 |

(Continued)

FOREIGN PATENT DOCUMENTS

WO    WO 98/46054    4/1998

OTHER PUBLICATIONS

M. Suer, et al., RF-front end and optical feeding system for a millimeterwWave broadband communication system at 60 GHz, SBMO/IEEE MTT-S. International Microwave and Optoelectronics Conference, 1997, pp. 227-232, XP000764638 p. 227, ln. 23, p. 229, ln. 29, figures 1, 2.

(Continued)

*Primary Examiner*—George Eng
*Assistant Examiner*—Un C. Cho
(74) *Attorney, Agent, or Firm*—Michael Best & Friedrich LLP

(57) ABSTRACT

A communications network, in particular for telephony, comprises at least one operator a plurality of remote units for exchanging signals with mobile terminals and an interface unit for controlling the data traffic between the operator and the remote units. The interface unit is connected to the remote units by a first transmission support in which the main signal propagates. The main signal is divided into a plurality of secondary signals, each identified by a preset parameter value. Each remote unit is designed to process at least one secondary signal selected from amongst the secondary signals into which the main signal is divided. The secondary signal is identified by the remote unit according to the above-mentioned present parameter value.

5 Claims, 3 Drawing Sheets

U.S. PATENT DOCUMENTS

2002/0003645 A1* 1/2002 Kim et al. .................. 359/145

OTHER PUBLICATIONS

N. K., Shankaranarayanan, et al., Multiport wireless access syte using fiber/coax networks for personal communications services (PCS) and subscriber loop applications, Global Telecommunications Conference, 1995. Conference Record. Communication Theory Mini-Conference, Globecom '95, IEEE Singapore Nov. 13-17, 1995, New York, NY, USA, IEEE, US, Nov. 13, 1995, pp. 977-981, XP010164519, ISBN: 0-78003-2509-5; p. 989, left-hand column, ln. 19, right-hand column, ln. 10, figure 2.

* cited by examiner

COMMUNICATION NETWORK IN PARTICULAR FOR TELEPHONY

TECHNICAL FIELD

The present invention relates to a communications network, in particular for telephony.

BACKGROUND ART

As is known, at present in the communications systems for cellular telephony the mobile terminals (cellular phones) dialog by means of radio frequencies with the Base Station Systems, hereinafter referred to with the abbreviation BSS (Base Station System), which are connected to the Control Centres, hereinafter referred to with the abbreviation MSC (Mobile Services Switching Centre). The latter allow a connection both to other MSCs, therefore to other mobile phones, and to the fixed network.

The BSSs and MSCs are fixed units and can be connected using optic fibre or with conventional electric cables.

Each BSS consists of a Controller, hereinafter referred to with the abbreviation BSC (Base Station Controller), connected to a plurality of transceivers, hereinafter referred to with the abbreviation BTS (Base Transceiver Station), which basically form the terminals of the fixed part of the network which controls communication between mobile phones.

In order to improve the quality of the signal and cover the widest possible areas, the BTSs are placed in strategic positions, in particular in high places, for example on the top of particularly tall buildings.

With the introduction of third generation (UMTS, Universal Mobile Telecommunications System) mobile phones, this is no longer possible, since the structure of the new base stations is much more bulky and heavy and, as a result, much more difficult to handle from a logistics viewpoint. It is easy to imagine how positioning it on a roof, for example, could be extremely problematic.

Therefore, a slight variation of the conventional structure of the BSSs became necessary, disconnecting the BTSs from the antennas and inserting interface units to control the communications traffic between the BTSs and the remote units (RU—the terminals which comprise the antennas for sending/receiving radio frequency signals to/from mobile phones).

The second section of the connection between the BTSs and RUs, from the interface to the RUs, is normally created using optic fibre with significant advantages in terms of the quality of the communication (low attenuation) and the speed of data transmission.

The data exchange between BTSs and RUs must occur in both directions. The data from the BTSs to the RUs and, as a result, to the mobile phones, is the Down-Link (DL), whilst the signals from the mobile phones received by the RUs and sent on to the BTSs are the Up-Link (UL).

Two different wavelengths are normally used for the above-mentioned data exchange, one for the DL and one for the UL.

A typical example of the connection between the base stations and remote units is the so-called "backbone" configuration. An optic fibre cable runs from the interface unit to all of the RUs and ends close to the last RU. Each RU picks up a portion of the signal present in the fibre, selects the DL wavelength, transforms the optical signal into an RF signal and sends it to the mobile phone by means of an antenna. In parallel, if the RU must send data to the BTS, it sends a UL signal at a preset wavelength, different to that of the DL, in the optic fibre.

In this way, there are two data flows supported by the optic fibre, one from the interface unit to the RUs (DL) and one, in the opposite direction to the first, from the RUs to the interface unit (UL).

The UL and DL can be provided using two physically different supports (one fibre for the DL and another fibre for the UL), without significantly altering the structure and operation of the above-mentioned configuration.

The main disadvantage of this type of connection between the BTSs and RUs is the excessive waste of band in order to set up a bi-directional connection. The connection for each RU uses double the band actually occupied by the signals to be transmitted/received. Too much optic fibre is also used, with significant economic effects on the set up of current systems based on state of the art structures.

SUMMARY

The aim of the present invention is to provide a new communications network, in particular for telephony, which allows maximum use to be made of the available band when transmitting/receiving signals between operators and remote units.

Another aim of the present invention is to minimise the amount of optic fibre used to create the connection between the operators and the remote units.

DETAILED DESCRIPTION

Further features and advantages are apparent in the detailed description below, with reference to the accompanying drawings, which illustrate a preferred embodiment of a communication network, in particular for telephony, without limited the scope of its application, and in which.

DESCRIPTION OF THE ILLUSTRATIVE EMBODIMENT

Figure 1:
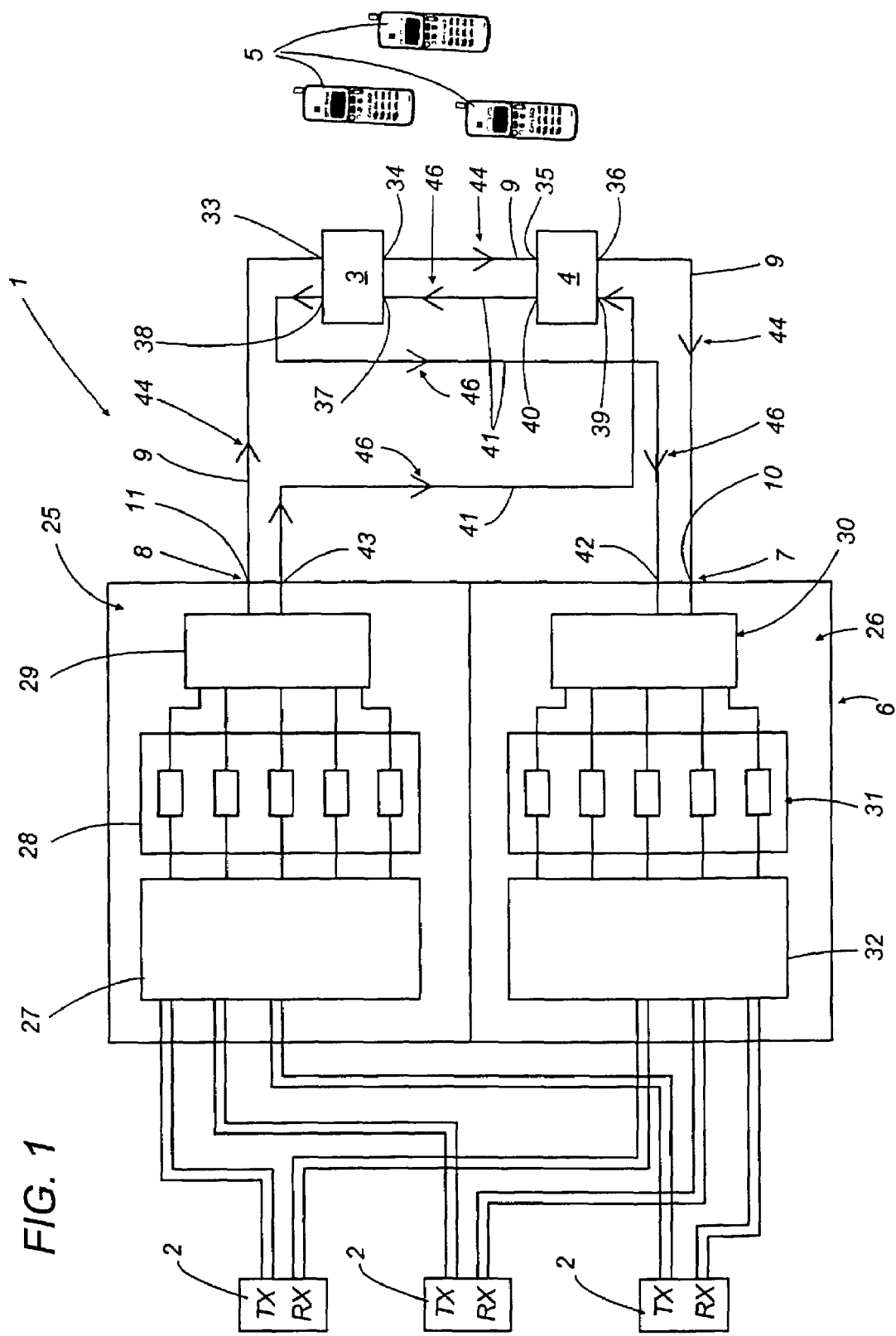
FIG. 1 is a block diagram of a communications network in accordance with the present invention.

A communications network, in particular for telephony, is labeled with the numeral 1 in the accompanying drawings.

The network 1 basically consists of an operator 2 (a unit controlled by a telecom company, which allows connection to the rest of the telephone network, both mobile and fixed) and a first remote unit 3 and at least a second remote unit 4, which use antennas and suitable circuit equipment to allow signals to be exchanged between the operator 2 and the mobile terminals 5. Between the operator 2 and the remote units 3, 4 there is an interface unit 6, designed to control the data traffic between the operator 2 and the remote units 3, 4.

The network 1 may comprise two or more operators, that is to say, a plurality of blocks controlled by different telephone companies for connection to the rest of the telephone network. In this case, the interface unit 6 controls access to the remote units 3, 4 depending on the requirements of each operator.

Advantageously, each operator 2 communicates with the interface unit 6 by transmission and reception using two carriers, each having a separate physical support.

The interface unit 6 is connected to the remote units 3, 4 using a first transmission support 9, preferably consisting of optic fibre, with at least a first end 10 connected to an interface unit 6 input 7, and at least a second end 11 connected to an interface unit 6 output 8. In this way, the remote units 3, 4 can send/receive signals to/from the interface unit 6 and, as a result, a bi-directional data flow is possible between the remote units 3, 4 and the operator 2.

As illustrated in FIG. 1, the interface unit 6 consists of a signal transmission circuit 25 and a signal reception circuit 26.

The signal transmission circuit 25 is positioned at the interface unit 6 output 8 and is connected to the second end 11 of the first transmission support 9. It is basically designed to pick up the signals from the operator 2 and send them to the remote units 3, 4 using the first transmission support 9. The signal transmission circuit 25 is made with a first routing matrix 27, a first electro-optical converter unit 28 and a multiplexer 29. The first routing matrix 27 has at least one input connected to the operator 2 and a plurality of outputs, each connected to a remote unit. The first routing matrix 27 is designed to route the signals from the operator 2 to the remote units 3, 4 pre-selected by the operator 2.

The electrical signals at the first routing matrix 27 outputs are converted into optical signals by the first electro-optical converter unit 28, so that they can then be sent using an optic fibre support. Finally, the multiplexer 29 downstream of the converters 28, bundles and transfers all optical signals in a single physical support, that is to say, the first transmission support 9.

Therefore, inside the first transmission support 9, a main signal 44 is transmitted, containing all of the data to be sent from the operator 2 to the remote units 3, 4 and vice versa, the data to be sent from the remote units 3, 4 to the operator 2.

Figure 3:
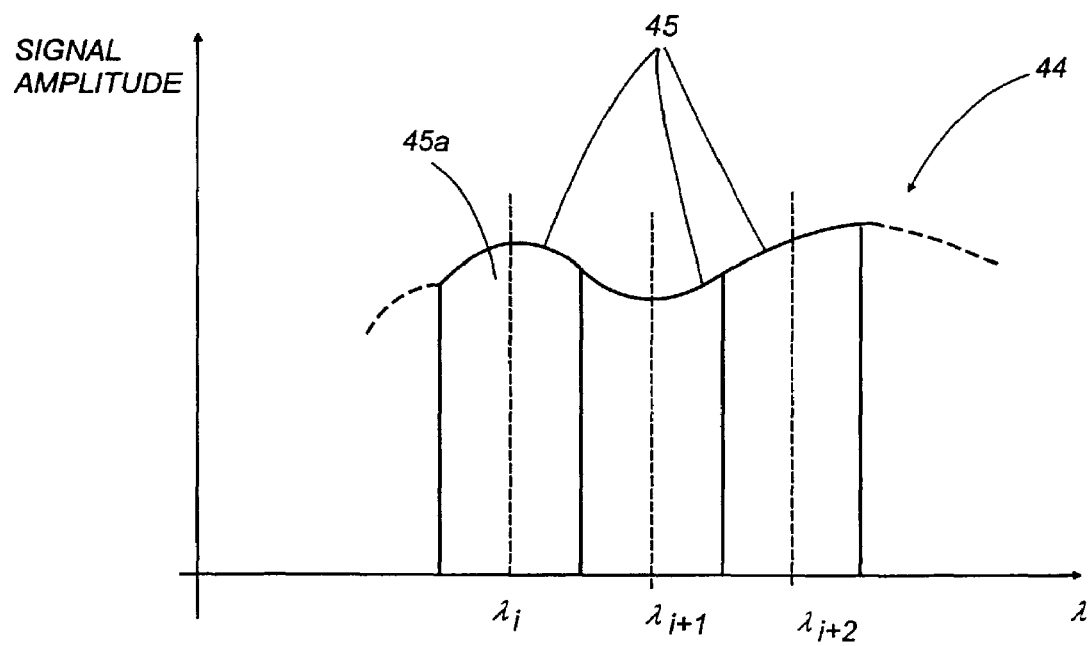
FIG. 3 is a schematic illustration of the structure of a signal processed by the network in FIG. 1.

FIG. 3 shows how the main signal 44, propagating in the first transmission support 9, consists of a plurality of secondary signals 45 identified by a preset parameter value characteristic of the main signal 44. Advantageously, said parameter may be the wavelength and each secondary signal 45 is, therefore, identified by its own wavelength λi, λi+1, λi+2, etc.

Conveniently, to optimise use of the optic fibre, that is to say, to maximise the number of carriers supported by the fibre, the wave division multiplexing (WDM) technique is used, which consists in sending data along the same fibre, using two or more signals with different wavelengths.

In particular, dense wave division multiplexing (D-WDM) is used, fixing the separation of the signal wavelengths propagating in the optic fibre in the 0.5–5 nm range.

Advantageously, semi-dense wave division multiplexing (SD-WDM) can also be used, in which special lasers modulate the signals, which are propagated at the third window of the optic fibre (propagation in an optic fibre occurs in three wavelength ranges, called "windows", the third corresponding to wavelengths of around 1550 nm).

The signal reception circuit 26 is completely symmetrical relative to the signal transmission circuit 25 described above. It has a demultiplexer 30, connected to the first end 10 of the first transmission support 9, to separate the various secondary signals 45 from the remote units 3, 4 sent to the circuits downstream by means of a plurality of outputs. The optical signals from the demultiplexer 30 are then converted into electrical signals by a second electro-optical converter unit 31, then sent to the operator 2 (or operators) by means of a second routing matrix 32.

In light of this, it is obvious how the interface unit 6 is able to control the traffic of signals between the operator 2 (or operators) and the remote units 3, 4.

Figure 2:
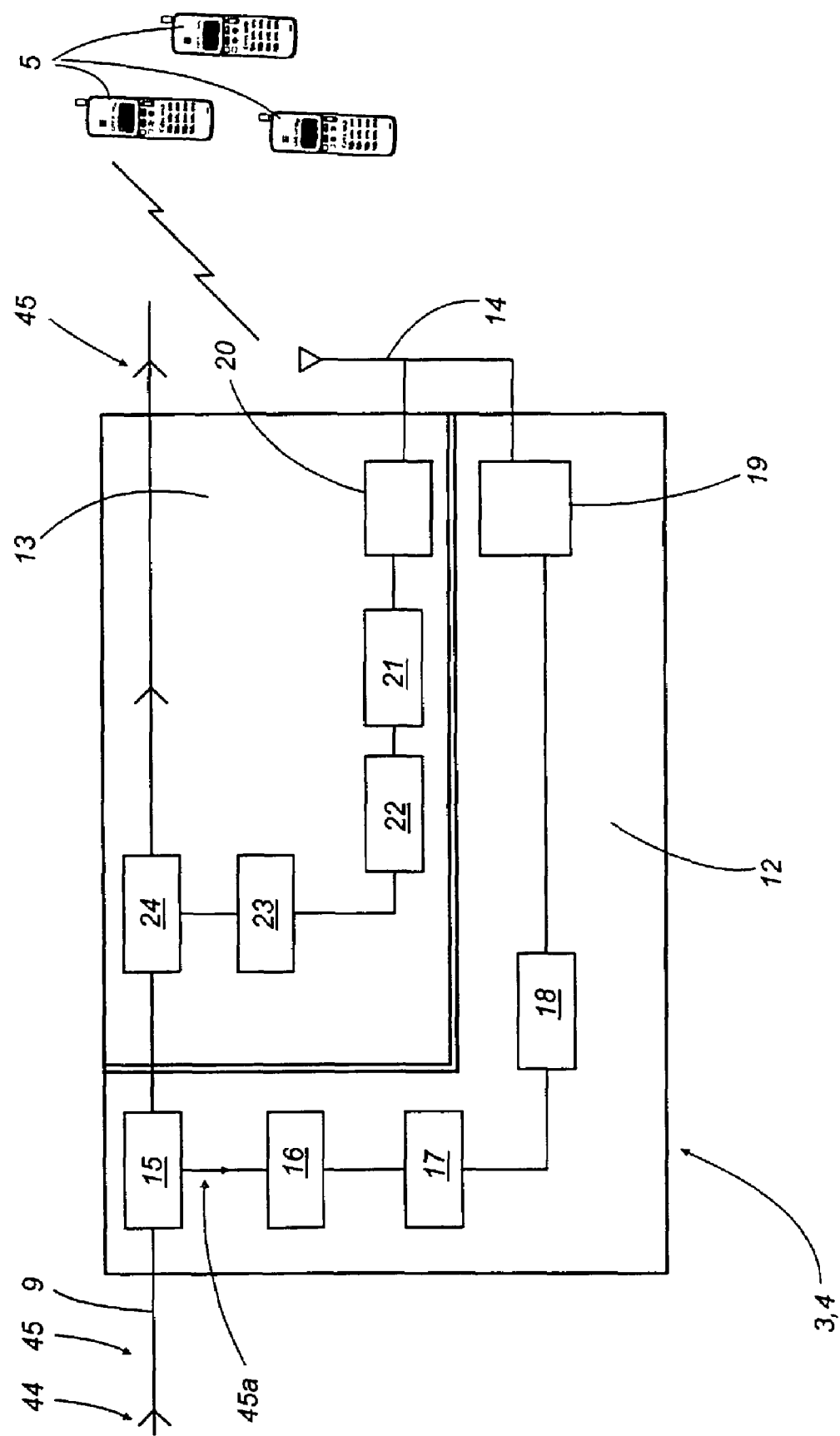
FIG. 2 illustrates the structure of some of the blocks in FIG. 1.

FIG. 2 is a block diagram of a single remote unit. It comprises a signal transmission block 12, connected to the first transmission support 9 to pick up at least one secondary signal 45a from the main signal 44 (the secondary signals 45 are then sent to the mobile terminals 5 by means of an antenna 14) and a signal reception block 13, which receives the RF signals from the mobile terminals 5 by means of the antenna 14 and adds them to the main signal 44 in the first transmission support 9.

Conveniently, the signal transmission block 12 is made using an optical filter element 15 to pick up at least one secondary signal 45a from the main signal 44, a first electro-optical converter 17 to transform the secondary signal 45a into an electrical signal, a first amplifier block 18 and a first RF filter 19 to treat the electrical signal before transmitting it in radio frequency to the mobile terminals 5 by means of the antenna 14.

Similarly, the signal reception block 13 comprises a second RF filter 20 and a second amplifier block 21 for treating the RF signals arriving from the mobile terminals 5 and received by the antenna 14, a second electro-optical converter 22 to transform the electrical signals into optical signals and a signal reception element 26 connected to the first transmission support 9 to add the contributions received from the mobile terminals 5 to the main signal 44.

Advantageously, to equalise the secondary signal 45a and prepare it for subsequent processing, the signal transmission block 12 has a first equaliser block 16 downstream of the optical filter element 15 and the signal reception block 13 has a second equaliser block 23 downstream of the second electro-optical converter 22.

The first transmission support 9 is made substantially in the form of an optic fibre loop which terminates at the interface unit 6 and passes through all of the remote units 3, 4 once. The first remote unit 3 has a first input 33 directly connected to the output 8 of the interface unit 6 and a first output 34 connected to a first input 35 of the second remote unit 4. The latter has a first output 36 directly connected to the input 7 of the interface unit 6.

Similarly, each remote unit is associated with at least one wavelength λi. If necessary a plurality of wavelengths λi, λi+1, etc. can be associated with a single remote unit.

In this way, when the operator 2 wants to send a signal to a given remote unit so that it will be transmitted to a mobile terminal 5, it uses the first routing matrix 27 and the first electro-optical converter unit 28 to shift the signal to the wavelength λi associated with the selected remote unit and the signal is introduced into the first transmission support 9 by the multiplexer 29.

Using the circuit equipment described above, the selected remote unit selects, within the main signal 44, the secondary signal 45a at the wavelength λi associated with the remote unit, converts it to RF and sends it to the mobile terminal 5 to which the signal is directed.

When the remote unit receives signals from the mobile terminal 5 which must be sent to the operator 2, it shifts them to its characteristic wavelength λi and inserts them into the main signal 44, so that at the end of propagation in the first transmission support 9, they reach the input of the interface unit 6 and, from here, are sent to the operator 2.

With a structure such as that described above, each remote unit is, therefore, associated with a wavelength λi on which it dialogs in both directions with the interface unit 6 and, therefore, with the operator 2.

The fact that the optic fibre support substantially assumes the form of a loop closed on the interface unit 6 allows the main signal 44 to be sent from the interface unit 6 output 8, to go through all of the remote units 3, 4 (transmitting to and receiving from them any signals at the preset wavelength λi) and to reach the interface unit 6 input 7, carrying all of the data gathered from the remote units 3, 4.

Advantageously, the network 1 may have a second transmission support 41, again made of optic fibre and having the twin purposes of making the system more reliable and improving the quality of reception and transmission of the mobile units 3, 4 and the interface unit 6.

As explained in greater detail below, another advantage of the second transmission support 41 is that the communications network 1 created is also resilient.

The second transmission support 41 is an optic fibre loop with a first end 42 connected to the interface unit 6 input and a second end 43 connected to the interface unit 6 output 8. Inside the second transmission support 41, an auxiliary signal 46 substantially equal to the main signal 44 is propagated.

The second transmission support 41 passes through all of the remote units 3, 4 once, so that the auxiliary signal 46 reaches the remote units 3, 4 in the opposite order to the main signal 44 propagated in the first transmission support 9. The second remote unit 4 has a second input 39 directly connected to the interface unit 6 output by means of the second transmission support 41 and an output connected to a second input 37 of the first remote unit 3 by means of the second transmission support 41. The first remote unit 3 has a second output 38 directly connected to the interface unit 6 input by means of the second transmission support 41.

The auxiliary signal 46 is a replica of the main signal 44 and is propagated in the second transmission support 41.

In this way, by supplying the remote units 3, 4 with the same data by means of two separate physical supports, there are significant advantages in terms of the quality of the communication. If, for example, the first transmission support 9 develops a fault, thanks to the second transmission support 41 there would be no need to interrupt the connection between the remote units 3, 4 and the interface unit 6.

Moreover, by constantly using both transmission supports 9, 41, so that the two identical signals 44, 46 are constantly supplied to each remote unit 3, 4 by means of independent supports, the probability of reception/transmission errors is reduced, that is to say, it becomes extremely unlikely that part of the data will be lost or altered as it travels between the interface unit 6 and the remote units 3, 4.

Use of the second transmission support 41 may be controlled in various ways. The auxiliary signal 46 may be propagated only if a fault develops in the first transmission support 9, or it may be constantly propagated parallel with the propagation of the main signal 44 in the first transmission support 9, to reduce the probability of error as indicated above.

If more than two remote units are required, a third remote unit may, for example, be positioned between the first remote unit 3 and the second remote unit 4.

The third remote unit would have a first input, connected to the first output 34 of the first remote unit 3 by the first transmission support 9, and a first output connected to the first input 35 of the second remote unit 4. The third remote unit would also have a second input, connected to the second output 40 of the second remote unit 4 by the second transmission support 41, and a second output, connected to the second input 37 of the first remote unit 3.

The networks described herein generally provide certain advantages.

First, an entire communications network is extremely economical to set up, since the optic fibre used is minimised.

Moreover, it is very efficient in terms of band use, since the same wavelength λi is used both for the DL and the UL between the interface unit and the remote units.

Another advantage is the fact that, thanks to the versatility of the routing matrices, the network is very flexible and can be adapted to various requirements when setting up the connections between the operators and the remote units.

Finally, the introduction of a second loop, parallel with and propagating in the opposite direction to the first, allows the creation of a communications network which is resilient and characterised by the high quality of the connection between the operators and the remote units.

The networks and its components described herein may be subject to modifications and variations without thereby departing from the scope of the claims. Moreover, all the elements of the network and its components may be substituted with technically equivalent elements.

The invention claimed is:

1. A communications network, in particular for telephony, comprising:
    at least one operator;
    a plurality of remote units designed to exchange signals with the operator and to exchange radio frequency (RF) signals with mobile terminals;
    an interface unit inserted between the operator and the remote units, the interface unit having at least one input for receiving signals from the remote units and at least one output for sending signals to the remote units, the interface unit also being designed to exchange signals with the operator;
    a first transmission support for connecting the interface unit to the remote units, the first transmission support being designed to support a main signal, the first transmission support having a first end connected to the interface unit input and at least a second end connected to the interface unit output, the main signal consisting of a plurality of secondary signals, each identified by a preset parameter value, each of the remote units receiving said main signal and being designed to process a secondary signal intended for it, each of the remote unites being able to select at least one secondary signal intended for it from said main signal according to the preset parameter value;
    wherein each remote unit comprises:
    a signal transmission block connected to the first transmission support for picking up at least one secondary signal from the main signal to be transmitted in the Down-Link (DL);
    a signal reception block connected to the first transmission support for adding at least one signal received in the Up-Link (UL) to the main signal;
    an antenna attached to the signal transmission block and to the signal reception block for transmitting RF signals to the mobile terminals and for receiving RF signals from the mobile terminals,
    wherein the signal transmission block comprises:
    an optical filter element connected to the first transmission support for selecting, within the main signal, the secondary signal characterized by the parameter value associated with the remote unit;
    preferably a first equalizer block connected downstream of the optical filter element;

a first electro-optical converter, for converting the optical signal from the interface unit into an electrical signal;

a first amplifier block connected to the first electro-optical converter;

a first RF filter for filtering the signals from the first converter.

2. A communications network, in particular for telephony, comprising:

at least one operator;

a plurality of remote units designed to exchange signals with the operator and to exchange radio frequency (RF) signals with mobile terminals;

an interface unit inserted between the operator and the remote units, the interface unit having at least one input for receiving signals from the remote units and at least one output for sending signals to the remote units, the interface unit also being designed to exchange signals with the operator;

a first transmission support for connecting the interface unit to the remote units, the first transmission support being designed to support a main signal, the first transmission support having a first end connected to the interface unit input and at least a second end connected to the interface unit output, the main signal consisting of a plurality of secondary signals, each identified by a preset parameter value, each of the remote units receiving said main signal and being designed to process a secondary signal intended for it, each of the remote unites being able to select at least one secondary signal intended for it from said main signal according to the preset parameter value;

wherein each remote unit comprises:

a signal transmission block connected to the first transmission support for picking up at least one secondary signal from the main signal to be transmitted in the Down-Link (DL);

a signal reception block connected to the first transmission support for adding at least one signal received in the Up-Link (UL) to the main signal;

an antenna attached to the signal transmission block and to the signal reception block for transmitting RF signals to the mobile terminals and for receiving RF signals from the mobile terminals, wherein the signal reception block comprises:

a second RF filter for filtering a signal from the antenna;

a second amplifier block connected to the second RF filter;

a second electro-optical converter for converting an electrical signal from the second RF filter into an optical signal;

a second equalizer block connected downstream of the second electro-optical converter;

a signal insertion element for adding a signal received, characterized by the preset parameter value associated with the remote unit, to the main signal.

3. A communications network, comprising:

at least one operator;

a first remote unit and at least a second remote unit, the remote units being designed to exchange signals with the operator and to exchange radio frequency (RF) signals with the mobile terminals;

an interface unit inserted between the operator and the remote units, the interface unit having at least one input for receiving signals from the remote units and at least one output for sending signals to the remote units, the interface unit also being designed to exchange signals with the operator;

a first transmission support for connecting the interface unit to the remote units, the first transmission support being designed to support a main signal, the first transmission support having a first end connected to the interface unit input and at least a second end connected to the interface unit output wherein the first remote unit has a first input directly connected to the interface unit output by the first transmission support and a first output, the second remote unit having a first input connected to the first output of the first remote unit by the first transmission support and a first output directly connected to the interface unit input by the first transmission support, the main signal propagating in the first transmission support from the second end to the first end, wherein the first transmission support basically consists of an optic fibre loop passing through each remote unit, the main signal being an optical signal propagating in the loop from the first remote unit to the second remote unit, the network further comprising a second transmission support, having a first end connected to the interface unit input and a second end connected to the interface unit output, for supporting an auxiliary signal substantially identical to the main signal, the auxiliary signal propagating in the second transmission support from the second end of the second transmission support to the first end of the second transmission support.

4. The network according to claim 3, wherein the second remote unit has a second input directly connected to the interface unit output by the second transmission support and a second output, the first remote unit having a second input connected to the second output of the second remote unit by the second transmission support and a second output directly connected to the interface unit input by the second transmission support, the auxiliary signal propagating in the second transmission support from the second remote unit to the first remote unit.

5. The network according to claim 4, wherein the second transmission support basically consists of an optic fibre loop which passes through each of the remote units, the auxiliary signal being an optical signal propagating in the second transmission support from the second remote unit to the first remote unit.

* * * * *